United States Patent
Hoffmann et al.

(10) Patent No.: US 11,625,557 B2
(45) Date of Patent: Apr. 11, 2023

(54) PROCESS TO LEARN NEW IMAGE CLASSES WITHOUT LABELS

(71) Applicant: HRL Laboratories, LLC, Malibu, CA (US)

(72) Inventors: Heiko Hoffmann, Simi Valley, CA (US); Soheil Kolouri, Agoura Hills, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 242 days.

(21) Appl. No.: 17/080,673

(22) Filed: Oct. 26, 2020

(65) Prior Publication Data

US 2021/0182618 A1   Jun. 17, 2021

Related U.S. Application Data

(63) Continuation-in-part of application No. 16/532,321, filed on Aug. 5, 2019.
(Continued)

(51) Int. Cl.
*G06K 9/62* (2022.01)
*B60W 50/06* (2006.01)
(Continued)

(52) U.S. Cl.
CPC .......... *G06K 9/6259* (2013.01); *B60W 50/06* (2013.01); *B60W 60/00272* (2020.02);
(Continued)

(58) Field of Classification Search
CPC ...... G06K 9/6259; G06K 9/627; G06K 9/629; G06K 9/6232; G06K 9/00523; G06N 3/08;
(Continued)

(56) References Cited

U.S. PATENT DOCUMENTS 9,633,483 B1    4/2017  Xu et al.
2007/0005356 A1  1/2007  Perronnin
(Continued)

FOREIGN PATENT DOCUMENTS

JP           5247480 B2      7/2013
WO     WO2020/091871 A1     5/2020

OTHER PUBLICATIONS

Ian Goodfellow, Yoshua Bengio and Aaron Courville, "Deep Learning", ISBN 9780262035613 (Year: 2016).*
(Continued)

*Primary Examiner* — Weiming He
(74) *Attorney, Agent, or Firm* — Tope-McKay & Associates

(57) ABSTRACT

Described is a system for learning object labels for control of an autonomous platform. Pseudo-task optimization is performed to identify an optimal pseudo-task for each source model of one or more source models. An initial target network is trained using the optimal pseudo-task. Source image components are extracted from source models, and an attribute dictionary of attributes is generated from the source image components. Using zero-shot attribution distillation, the unlabeled target data is aligned with the source models similar to the unlabeled target data. The unlabeled target data are mapped onto attributes in the attribute dictionary. A new target network is generated from the mapping, and the new target network is used to assign an object label to an object in the unlabeled target data. The autonomous platform is controlled based on the object label.

12 Claims, 13 Drawing Sheets

Related U.S. Application Data

(60) Provisional application No. 62/946,277, filed on Dec. 10, 2019, provisional application No. 62/752,166, filed on Oct. 29, 2018.

(51) Int. Cl.
  *G06N 20/00* (2019.01)
  *G06N 3/02* (2006.01)
  *B60W 60/00* (2020.01)

(52) U.S. Cl.
  CPC ............ *G06K 9/627* (2013.01); *G06K 9/6215* (2013.01); *G06K 9/6255* (2013.01); *G06N 3/02* (2013.01); *G06N 20/00* (2019.01); *B60W 2420/42* (2013.01)

(58) Field of Classification Search
  CPC . G06N 3/088; G06N 3/02; G06T 2207/20081
  See application file for complete search history.

(56) References Cited

U.S. PATENT DOCUMENTS

| | | |
|---|---|---|
| 2007/0258648 A1 | 11/2007 | Perronnin |
| 2009/0297050 A1 | 12/2009 | Li et al. |
| 2010/0040285 A1 | 2/2010 | Csurka |
| 2010/0226564 A1 | 9/2010 | Marchesotti |
| 2014/0270350 A1 | 9/2014 | Rodriguez-Serrano |
| 2014/0270495 A1 | 9/2014 | Tu |
| 2019/0101634 A1* | 4/2019 | Baheti ................... G01S 13/449 |
| 2019/0130220 A1 | 5/2019 | Zou |
| 2020/0005154 A1 | 1/2020 | Herbster |

OTHER PUBLICATIONS

10th European Conference on Computer Vision Marseille, France, Oct. 2008, Proceedings, Part III, LNCS5304 (Year: 2008).*
Notification of Transmittal of International Search Report and the Written Opinion of the International Searching Authority for PCT/US2019/016550; dated May 24, 2019.
International Search Report of the International Searching Authority for PCT/US2019/016550; dated May 24, 2019.
Written Opinion of the International Searching Authority for PCT/US2019/016550; dated May 24, 2019.
Guanbin Li et al., 'Visual Saliency Detection Based on Multiscale Deep CNN Features', IEEE Transactions on Image Processing, Sep. 7, 2016.
Yao Lu, 'Unsupervised Learning for Image Classification', University of Helsinki Department of Computer Science, Dec. 8, 2015.
Russakovsky, Olga, and Li Fei-Fei. "Attribute learning in large-scale datasets." In European Conference on Computer Vision, pp. 1-14. Springer Berlin Heidelberg, 2010.
Simonyan, Karen, and Andrew Zisserman. "Very deep convolutional networks for large-scale image recognition." arXiv preprint arXiv:1409.1556 (2014), pp. 1-14.
Xie, Junyuan, Ross Girshick, and Ali Farhadi. "Unsupervised Deep Embedding for Clustering Analysis." arXiv preprint arXiv: 1511.06335 (2015), pp. 1-10.
Akata, Zeynep, Florent Perronnin, Zaid Harchaoui, and Cordelia Schmid. "Label-embedding for attribute-based classification." In Proceedings of the IEEE Conference on Computer Vision and Pattern Recognition, pp. 819-826. 2013.
Romera-Paredes, Bernardino, and P. H. S. Torr. "An embarrassingly simple approach to zero-shot learning." In Proceedings of The 32nd International Conference on Machine Learning, pp. 2152-2161. 2015.
Farhadi, Ali, Ian Endres, Derek Hoiem, and David Forsyth. "Describing objects by their attributes." In Computer Vision and Pattern Recognition, 2009. CVPR 2009. IEEE Conference on, pp. 1778-1785. IEEE, 2009.
Lindeberg, Tony. Scale-space theory in computer vision. vol. 256., Chapter 14: Direct Computation of Multi-Scale Shape Cues, Springer Science & Business Media, 2013, pp. 349-382.
Sotiras, Aristeidis, Susan M. Resnick, and Christos Davatzikos. "Finding imaging patterns of structural covariance via non-negative matrix factorization." NeuroImage 108 (2015): pp. 1-16.
Tan, Pang-Ning, Michael Steinbach, Anuj Karpatne, and Vipin Kumar, Introduction to Data Mining, 2nd Ed., Chapter 7: Cluster Analysis: Basic Concepts and Algorithms, Pearson, 2019.
Ref: Görür, D. and Rasmussen, C.E., 2010. Dirichlet process gaussian mixture models: Choice of the base distribution. Journal of Computer Science and Technology, 25(4), pp. 653-664.
Notification of and Transmittal of International Search Report and the Written Opinion of the International Searching Authority for PCT/US2020/057404; dated Mar. 5, 2021.
Ahmed, AMR, et al, "Training Hierarchical Feed-Forward Visual Recognition Models Using Transfer Learning from Pseudo-Tasks," Oct. 12, 2008 (Oct. 12, 2008), Lecture Notes in Computer Science; [Lecture Notes in Computer Science ; Lect . Notes Computer], pp. 69-82.
Meng, Ye, et al, "Self-Training Ensemble Networks for Zero-Shot Image Recognition," arxiv . org, Cornell University Library, 201 Olin Library Cornell University Ithaca, NY, 14853, May 19, 2018 (May 19, 2018), pp. 1-12.
Marc'Aurelio, Ranzato, et al, "Unsupervised Learning of Invariant Feature Hierarchies with Applications to Object Recognition," CVPR '07. IEEE Conference on Computer Vision and Pattern Recognition; Jun. 18-23, 2007; Minneapolis, MN, USA, IEEE, Piscataway, NJ, USA, Jun. 1, 2007 (Jun. 1, 2007), pp. 1-8.
Xian, Y., Schiele, B. and Akata, Z., 2017. Zero-shot learning—the good, the bad and the ugly. Proceedings of the IEEE Conference on Computer Vision and Pattern Recognition, pp. 4582-4591.
Noroozi, M., Vinjimoor, A., Favaro, P. and Pirsiavash, H., 2018. Boosting Self-Supervised Learning via Knowledge Transfer. Proceedings of the IEEE Conference on Computer Vision and Pattern Recognition, pp. 9359-9367.
Kolouri, S., Martin, C.E. and Hoffmann, H., Jul. 2017. Explaining distributed neural activations via unsupervised learning. CVPR Workshop on Explainable Computer Vision and Job Candidate Screening Competition (vol. 2), pp. 1670-1678.
Kolouri, S., Zou, Y. and Rohde, G.K., 2016. Sliced Wasserstein Kernels for Probability Distributions. Proceedings of the IEEE Conference on Computer Vision and Pattern Recognition, pp. 5258-5267.
Kolouri, S., Pope, P. E., Martin, C.E. and Rohde, G.K., 2018. Sliced-Wasserstein Autoencoder: An Embarrassingly Simple Generative Model. pp. 1-25, arXiv preprint arXiv:1804.01947.
Dong, W., Moses, C. and Li, K., Mar. 2011. Efficient k-Nearest Neighbor Graph Construction for Generic Similarity Measures. Proceedings of the 20th International Conference on Worid Wide Web, pp. 577-586.
Kolouri, S., Rohde, G.K. and Hoffmann, H., Sliced Wasserstein Distance for Learning Gaussian Mixture Models. In Proceedings of the IEEE Conference on Computer Vision and Pattern Recognition, pp. 3427-3436.
Wang, K., Zhang, D., Li, Y., Zhang, R. and Lin, L., 2017. Cost-Effective Active Learning for Deep Image Classification. IEEE Transactions on Circuits and Systems for Video Technology, 27(12), pp. 2591-2600.
Pastor, P., Hoffmann, H., Asfour, T., and Schaal, S., 2009. Learning and Generalization of Motor Skills by Learning from Demonstration. IEEE International Conference on Robotics and Automation, pp. 763-768.
Sarkar, P., Moore, A. W., & Prakash, A., 2008. Fast Incremental Proximity Search in Large Graphs. In Proceedings of the 25th International Conference on Machine learning, pp. 896-903.
International Search Report for International Application No. PCT/US2019/045169, dated Nov. 8, 2019, pp. 1-4.
Written Opinion for International Application No. PCT/US2019/045169, dated Nov. 8, 2019, pp. 1-20.
Murez, Zak, et al., "Image to Image Translation for Domain Adaptation," Jun. 18, 2018, pp. 4500-4509, 2018 IEEE/CVF Conference on Computer Vision and Pattern Recognition.

(56) References Cited

OTHER PUBLICATIONS

Shen, Jian, et al., "Wasserstein Distance Guided Representation Learning for Domain Adaptation," Jul. 5, 2017, pp. 1-12.
Deshpande, Ishan, et al., "Generative Modeling using the Sliced Wasserstein Distance," Mar. 29, 2018, pp. 1-13.
Wu, Jiqing, et al., "Sliced Wasserstein Generative Models," Jun. 8, 2017, pp. 1-16.
Zhang, Wechen, et al., "Collaborative and Adversarial Network for Unsupervised domain adaptation," Jun. 18, 2018, pp. 3801-3809.
Zou, Yang, et al., "Unsupervised Domain Adaptation for Semantic Semantic Segmentation via Class-Balanced Self-training," Oct. 7, 2018, pp. 1-17.
Kolouri, Soheil, Yang Zou, and Gustavo K. Rohde, "Sliced Wasserstein kernels for probability distributions." Proceedings of the IEEE Conference on Computer Vision and Pattern Recognition 2016, pp. 5258-5267.
Hagan, MT and Menhaj, M.B., 1994. "Training feedforward networks with the Marquardt algorithm." IEEE transactions an Neural Networks, 5(6), pp. 989-993.
LeCun, Yann, et al. "Backpropagation applied to handwritten zip code recognition." Neural Computation 1.4 (1989): pp. 541-551.
Kolouri, S.; Martin, C. E.; and Rohde, G. K. 2018. "Sliced-Wasserstein Autoencoder: An embarrassingly simple generative model." arXiv preprint arXiv:1804.01947, pp. 1-25.
Y. LeCun, L. Bottou, Y. Bengio, and P. Haffner. "Gradient-based learning applied to document recognition." Proceedings of the IEEE, 86(11):2278-2324, Nov. 1998.
Y. Netzer, T. Wang, A. Coates, A. Bissacco, B. Wu, A. Y. Ng. "Reading Digits in Natural Images with Unsupervised Feature Learning." NIPS Workshop on Deep Learning and Unsupe!Vised Feature Learning 2011, pp. 1-9.
Schwegmann, C.; Kleynhans, W.; Salmon, B.; Mdakane, L.; and Meyer, R. 2016. "Very deep learning for ship discrimination in synthetic aperture radar imagery." In IEEE International Geo. and Remote Sensing Symposium, pp. 104-107.
Ghifary, M.; Kleijn, W. B.; Zhang, M.; Balduzzi, D.; and Li, W. 2016. "Deep reconstructionclassification networks for unsupervised domain adaptation." In European Conference on Computer Vision, pp. 597-613. Springer.
Hull, Jonathan J. "A database for handwritten text recognition research." IEEE Transactions on pattern analysis and machine intelligence 16.5 (1994): pp. 550-554.
Simard, P. Y.; Steinkraus, D.; and Platt, J. C. 2003. "Best practices for convolutional neural networks applied to visual document analysis." In Seventh International Conference on Document Analysis and Recognition, 2003. Proceedings, pp. 958-963.
Lee, Chen-Yu, "Sliced Wasserstein Discrepancy for Unsupervised Domain Adaptation," Proceedings of the IEEE Conference on Computer Vision and Pattern Recognition (2019), pp. 10285-10295.
Notification of and the International Preliminary Report on Patentability Chapter II for PCT/US2020/057404; dated Apr. 4, 2022.
Office Action for U.S. Appl. No. 16/532,321, dated Jun. 8, 2022.
List of References for the Office Action for U.S. Appl. No. 16/532,321, dated Jun. 8, 2022.
Response to Office Action for U.S. Appl. No. 16/532,321, dated Jun. 8, 2022.
Claims for Response to Office Action for U.S. Appl. No. 16/532,321, dated Jun. 8, 2022.
Arguments for Response to Office Action for U.S. Appl. No. 16/532,321, dated Jun. 8, 2022.
Interview Summary for U.S. Appl. No. 16/532,321, dated Jun. 8, 2022.
Final Rejection for U.S. Appl. No. 16/532,321, dated Jun. 8, 2022.
Notice of Allowance for U.S. Appl. No. 16/267,033, dated Nov. 25, 2019.

\* cited by examiner

PROCESS TO LEARN NEW IMAGE CLASSES WITHOUT LABELS

CROSS-REFERENCE TO RELATED APPLICATIONS

This is a Continuation-in-Part Application of U.S. application Ser. No. 16/532,321 filed Aug. 5, 2019, entitled "System and Method for Few-Shot Transfer Learning", the entirety of which is incorporated herein by reference. U.S. application Ser. No. 16/532,321 is a Non-Provisional Application of U.S. Provisional Patent Application No. 62/752,166, filed Oct. 29, 2018, entitled "System and Method for Few-Shot Transfer Learning", the entirety of which is incorporated herein by reference.

This is a Non-Provisional Application of U.S. Provisional Patent Application No. 62/946,277, filed Dec. 10, 2019, entitled, "Process to Learn New Image Classes Without Labels", the entirety of which is incorporated herein by reference.

BACKGROUND OF INVENTION

(1) Field of Invention

The present invention relates to a system for learning new image classes from new sensory input and, more particularly, to a system for learning new image classes from new sensory input without labels.

(2) Description of Related Art

Existing methods for learning from few labeled samples use a deep neural network that is pre-trained on a different, but similar, dataset with many labeled samples. The existing methods then re-tune the final layer or layers of the network to classify the new target dataset. This approach has two weaknesses. First, the approach assumes common features between datasets without enforcing commonality, leading to errors. Second, the approach neglects the abundance of unlabeled data, limiting its performance (label reduction is limited to about 100× before dramatically losing accuracy).

For learning without labels, state-of-the-art zero-shot learning (ZSL) approaches struggle with two things: 1) defining semantically meaningful attributes, which often come from human annotation or from paired textual domains; and 2) not knowing if the input samples belong to seen or unseen classes of data (i.e., generalized-ZSL versus classic ZSL), leading to performance much lower than for supervised learning (8× higher prediction error than that described in Literature Reference No. 1 in the List of Incorporated Literature References). Self-supervised learning methods have been recently used for transfer learning leading to few-shot learning accuracies of approximately 90% of fully supervised learning accuracy in the target domain. These methods, however, still require 10-100 labels per class, such as that described in Literature Reference No. 2.

Thus, a continuing need exists for a method that allows for learning object classes without any training label or with only a small set of training labels.

SUMMARY OF INVENTION

The present invention relates to a system for learning new image classes from new sensory input and, more particularly, to a system for learning new image classes from new sensory input without labels. The system comprises one or more processors and a non-transitory computer-readable medium having executable instructions encoded thereon such that when executed, the one or more processors perform multiple operations. The system performs pseudo-task optimization to identify an optimal pseudo-task for each source model of one or more source models. An initial target network is trained with self-supervised learning using the optimal pseudo-task. A plurality of source image components is extracted from the one or more source models. An attribute dictionary of abstract attributes is generated from the plurality of source image components. Using zero-shot attribution distillation, a set of unlabeled target data is aligned with the one or more source models that are similar to the set of unlabeled target data. The set of unlabeled target data are mapped onto a plurality of abstract attributes in the attribute dictionary. A new target network is generated from the mapping. Using the new target network, an object label is assigned to an object in the unlabeled target data. The autonomous platform is controlled based on the assigned object label.

In another aspect, the set of unlabeled target data is an input image, and mapping the unlabeled target data onto abstract attributes further comprises dissecting the input image into a plurality of target image components; comparing the plurality of target image components with the plurality of source image components; assigning the object label to the object based on the comparison; generating an executable control script appropriate for the object label; and causing the autonomous platform to execute the control script and perform an action corresponding to the control script.

In another aspect, a source similarity graph is used to select the one or more source models that are similar to the set of unlabeled target data and performing pseudo-task optimization further comprises computing a similarity measure between the one or more source models; generating the source similarity graph based on the similarity measure; and using the source similarity graph, identifying one or more source models in the plurality of source models that are similar to the set of unlabeled target data.

In another aspect, extracting the plurality of source image components and generating the attribute dictionary further comprises generating the plurality of source image components for each source model using unsupervised data decomposition; mapping the plurality of source image components and their corresponding labels onto the plurality of abstract attributes, resulting in clusters of abstract attributes; and generating the attribute dictionary from the clusters of abstract attributes.

In another aspect, the autonomous platform is a vehicle, and the system causes the vehicle to perform a driving operation in accordance with the assigned object label.

In another aspect, a source similarity graph between two or more source models is generated, pseudo-tasks for each source model are learned, a plurality of source image components is extracted from each source model, an attribute dictionary of abstract attributes is generated from the plurality of source image components, a set of target data from a new target domain is mapped onto the attribute dictionary, and a new target network is generated from the mapping.

In another aspect, data from the new target network is collected, and object labels are propagated in a latent feature space, resulting in an improved dictionary of abstract attributes and a refined target network.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
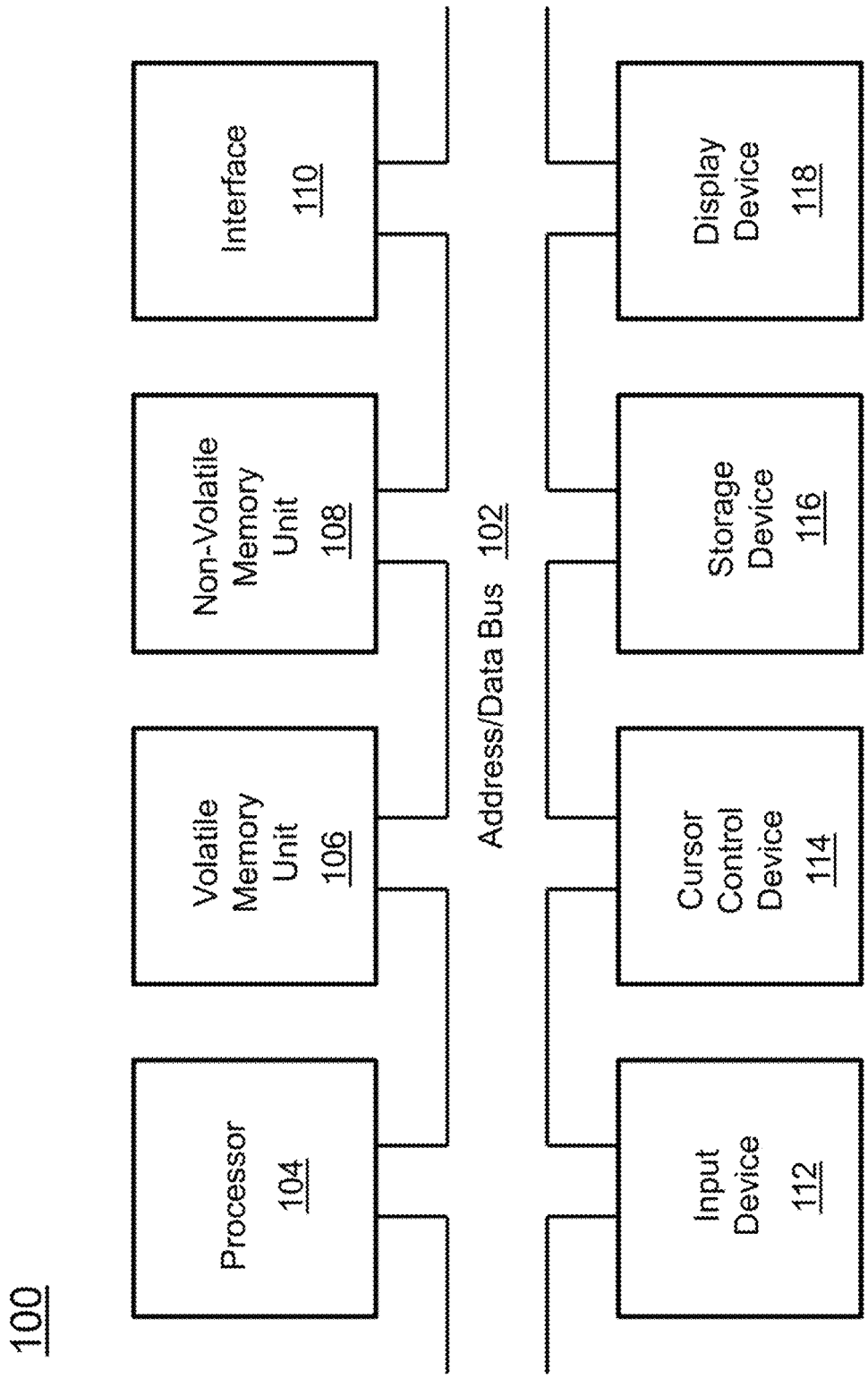
FIG. 1 is a block diagram depicting the components of a system for learning new image classes without labels according to some embodiments of the present disclosure.

The present invention relates to a system for learning new image classes without labels and, more particularly, to a system for learning new image classes without labels. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Xian, Y., Schiele, B. and Akata, Z., 2017. Zero-shot learning—the good, the bad and the ugly. Proceedings of the IEEE Conference on Computer Vision and Pattern Recognition, pp. 4582-4591.
2. Noroozi, M., Vinjimoor, A., Favaro, and Pirsiavash, H., 2018, Boosting Self-Supervised Learning via Knowledge Transfer. Proceedings of the IEEE Conference on Computer Vision and Pattern Recognition.
3. Kolouri, S., Martin, C. E. and Hoffmann, H., 2017, July. Explaining distributed neural activations via unsupervised learning. CVPR Workshop on Explainable Computer Vision and Job Candidate Screening Competition (Vol. 2).
4. Kolouri, S., Zou, Y. and Rohde, G. K., 2016. Sliced Wasserstein Kernels for Probability Distributions. Proceedings of the IEEE Conference on Computer Vision and Pattern Recognition, pp. 5258-5267.
5. Kolouri, S., Pope, P. E., Martin, C. E. and Rohde, G. K., 2018. Sliced-Wasserstein Autoencoder: An Embarrassingly Simple Generative Model. arXiv preprint arXiv: 1804.01947.
6. Dong, W., Moses, C, and Li, K., 2011, March. Efficient k-Nearest Neighbor Graph Construction for Generic Similarity Measures. Proceedings of the 20th International Conference on World Wide Web, pp. 577-586.
7. Kolouri, S., Rohde, G. K, and Hoffmann, H., Sliced Wasserstein Distance for Learning Gaussian Mixture Models. In Proceedings of the IEEE Conference on Computer Vision and Pattern Recognition, pp. 3427-3436.
8. Wang, K., Zhang, D., Li, Y., Zhang, R. and Lin, L., 2017. Cost-Effective Active Learning for Deep Image Classification. IEEE Transactions on Circuits and Systems for Video Technology, 27(12), pp. 2591-2600.
9. Pastor, P., Hoffmann, H., Asfour, T., and Schaal, S., 2009. Learning and Generalization of Motor Skills by Learning from Demonstration. IEEE International Conference on Robotics and Automation.
10. Sarkar, P., Moore, A. W., & Prakash, A., 2008. Fast Incremental Proximity Search in Large Graphs. In Proceedings of the 25th International Conference on Machine learning, pp. 896-903.

(2) Principal Aspects

Various embodiments of the invention include three "principal" aspects. The first is a system for learning new image classes without labels. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
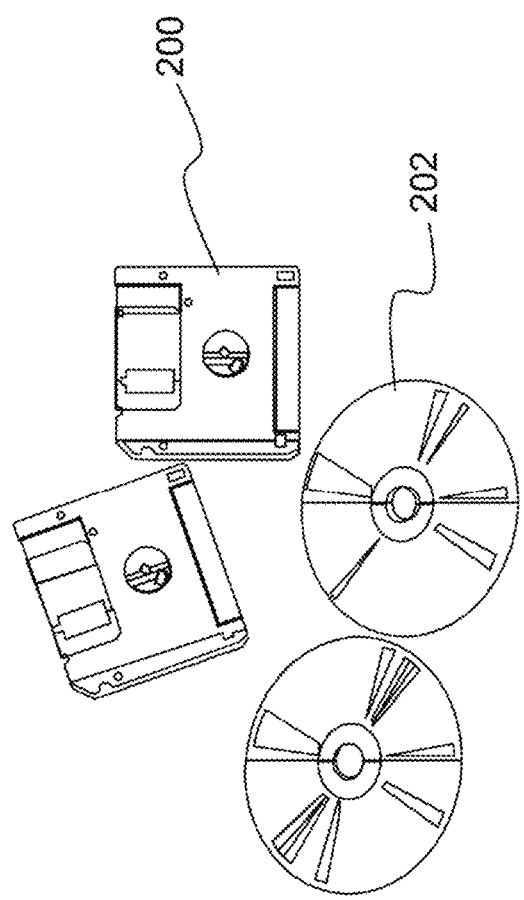
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described herein is a process that enables autonomous platforms (e.g., robots, vehicles) in the field to quickly learn object classes without any training labels or with only a small set of training labels. The invented process learns a new machine learning model based on novel (i.e., previously unseen) sensory input, where the input may be from an optical camera. This learning process leverages a dataset of prior trained models by finding structure in these models that enable learning, without labels, an object class within new sensory data. The system described herein automatically finds object components in the prior trained models as well as in the novel sensory data to automatically match the distribution of components between prior models and novel data. By matching the component distributions, even if they come from different sensors, new data can be identified by mapping component compositions to objects in a database. Non-limiting examples of "different sensors" include two (or more) cameras with different lenses, and a regular camera and an infrared camera. In addition, the method according to embodiments of the present disclosure is used to bootstrap the learning of new machine learning models. Here, the system optimizes a pseudo, or surrogate, task for learning a new model. A pseudo task is, for example, taking away the color of an image and training a network to predict again the color for each pixel (this process is also called self-supervised learning). This pseudo task is not the actual task but trains the network in a way that makes it easier to learn the actual task. Finding the right pseudo task has been done manually in the prior art. In this invention, the pseudo task is found automatically, as will be described in detail below.

Figure 3:
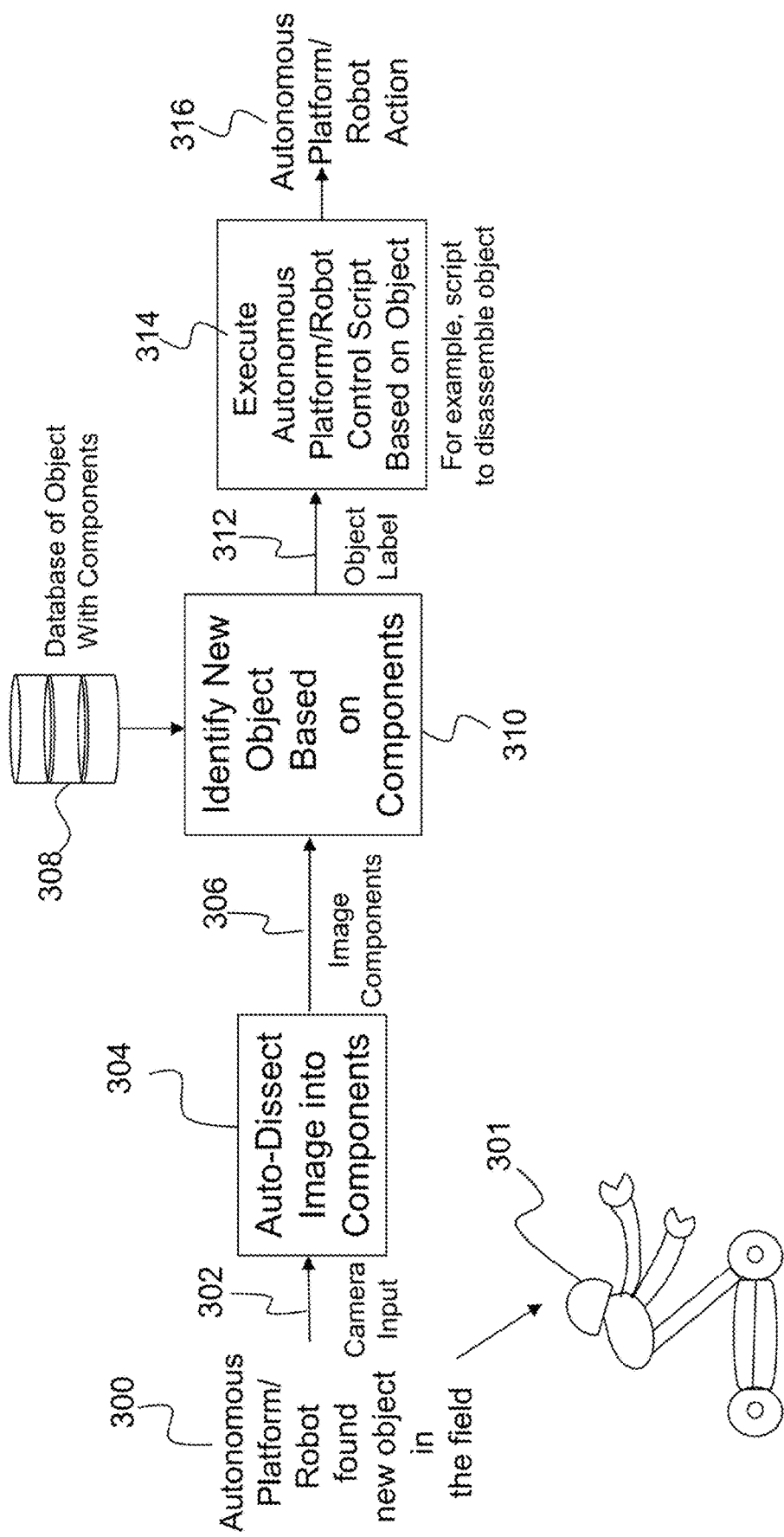
FIG. 3 is an illustration of key components of the system for learning new image classes without labels according to some embodiments of the present disclosure.

FIG. 3 shows the key elements of the invention. Upon an autonomous platform (e.g., robot (element 301)) discovering a new physical object in the field (element 300), the robot (element 301) processes the camera input (element 302), which are images of the object. Here, a new object means that the robot (element 301) was not trained on the object for its mission, but the nature of the object is known to mankind, non-limiting examples of which include a traffic cone, a vehicle that is different than one the robot (element 301) has been trained on, an animal, etc.

As a next step (element 304), the invented process begins to automatically dissect the image (i.e., camera input (element 302) into its components (element 306). An example embodiment for such automatic dissection is described in Literature Reference No 3. The image components (element 306) are matched with components from a database (element 308). Based on this component-wise matching, the identity of the object is revealed (i.e., identify new object based on components (element 310)) and assigned an object label (element 312). The system described herein is used to generate a control script to automate execution of a task (or action) to be performed by an autonomous platform, such as a robot (element 301). The autonomous platform executes the control script (element 314) that is appropriate for, or corresponds to, the labeled object (element 312), such as instructions to disassemble the object, and the autonomous platform performs the action (element 316) in accordance with the control script (element 314). The control script (element 314) is a predefined control script that can be either manually written, learned from human observation, or automatically generated in an optimization process (e.g., using genetic algorithms). Learning from human observation is described in detail in Literature Reference No. 9. In addition, the robot (element 301) trains a new machine learning model with the images of the object (i.e., camera input (element 302) and the corresponding label (i.e., object label (element 312).

Figure 4:
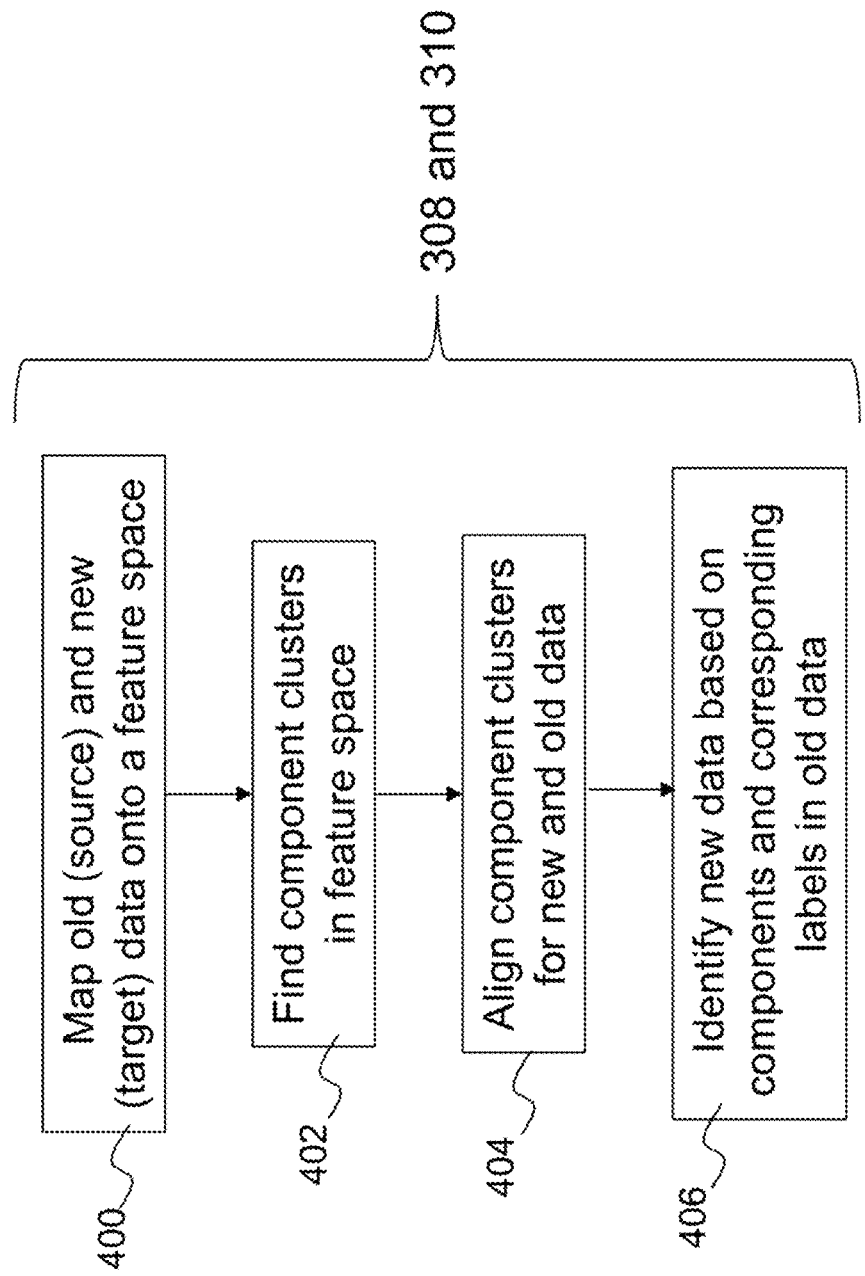
FIG. 4 is a flow chart illustrating a process to leverage old data for learning from new data according to some embodiments of the present disclosure.

FIG. 4 provides more details on identifying the object based on components (element 310), which includes identifying a new object based on components (FIG. 3, element 310) matched with components in the database of object components (FIG. 3, element 308). Both the components from the database (i.e., source or old data) as well as the components from the new data are mapped onto a feature space (element 400). In this feature space, the data points are clustered, revealing clusters of components (element 402). Initially, the clustering is carried out based solely on the components from the database. When presenting new data, the components in feature space are aligned with the feature space representation of the components from the database (i.e., old data) (element 404). After alignment, the components from the new data can be mapped onto corresponding attributes in the database to identify new data (element 406). Since each object in the database has a known composition of attributes, the object identity or label can be retrieved based on the attributes.

Figure 5A:
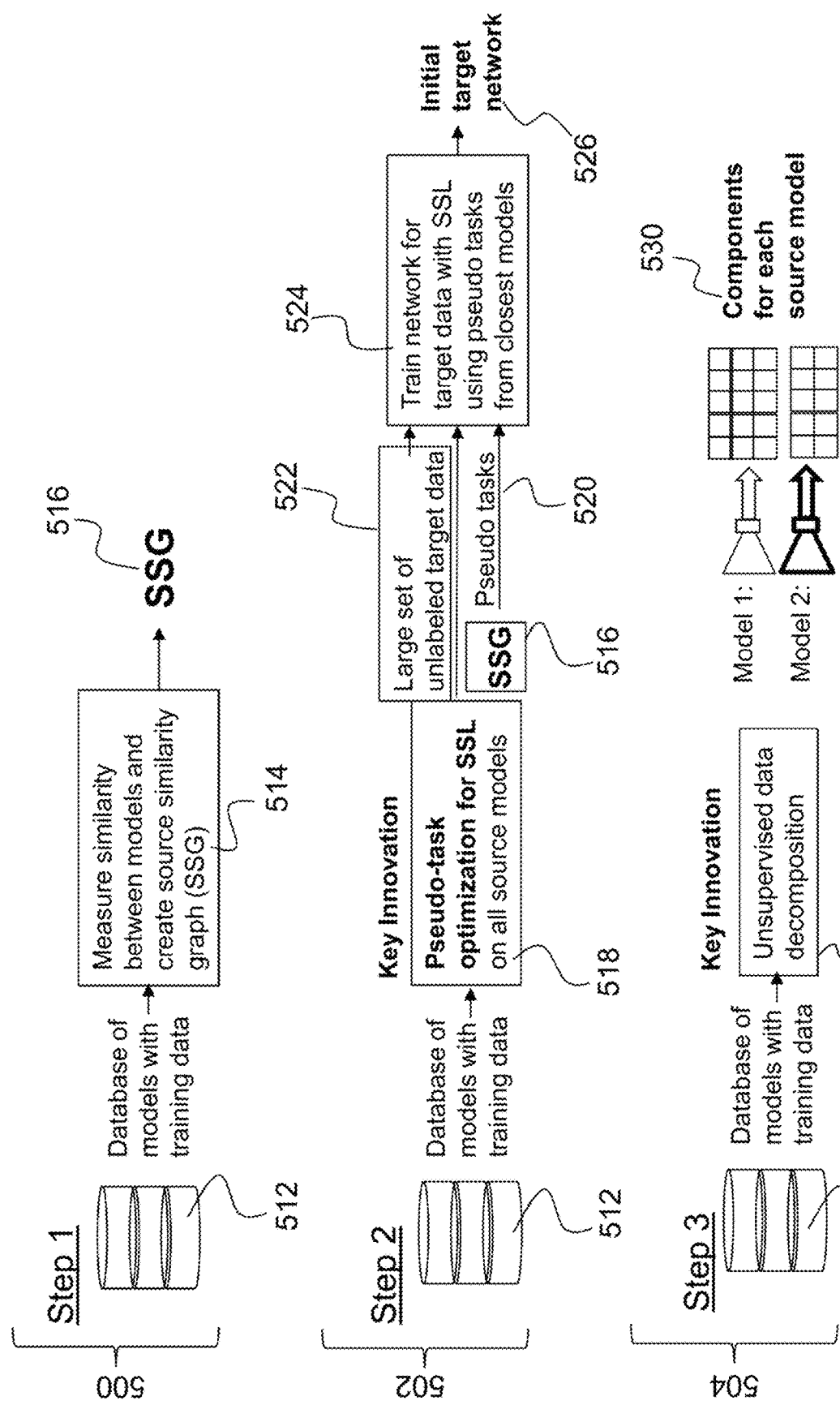
FIG. 5A is an illustration of Steps 1 through 3 of a process that enables learning with a fraction of labels per class in a new target domain according to some embodiments of the present disclosure.
Figure 5B:
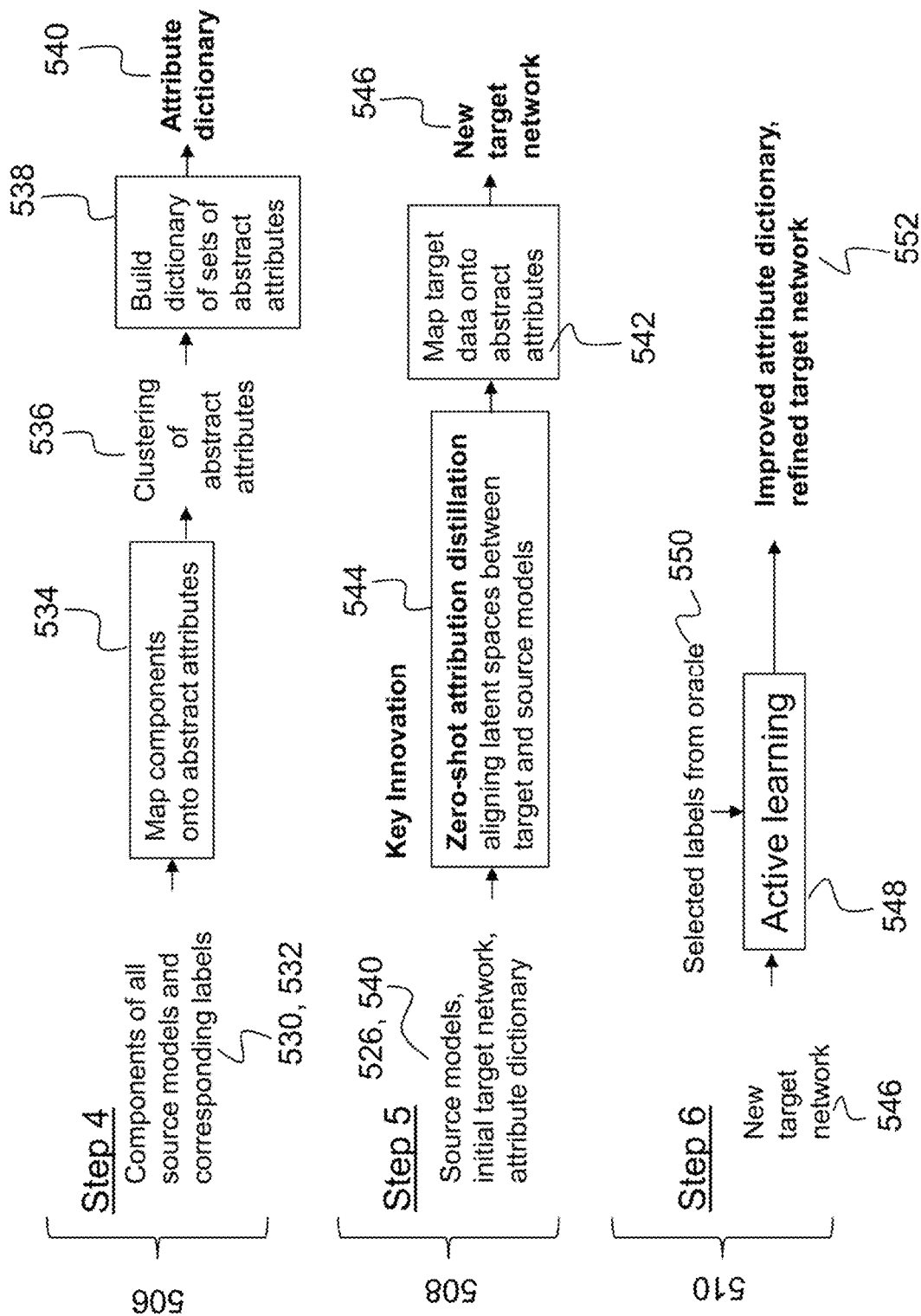
FIG. 5B is an illustration of Steps 4 through 6 of a process that enables learning with a fraction of labels per class in a new target domain according to some embodiments of the present disclosure.

Before one can map data onto the feature space (element 400) and carry out the component alignment (element 404), several steps have to be computed in advance. These initial steps are Steps 1 to 4 in the 6-step outline below and illustrated in FIGS. 5A and 5B. FIG. 5A depicts Steps 1 to 3 of the process described herein, and FIG. 5B depicts Steps 4-6 of the process. Step 5 includes the alignment (element 404), and Step 6 is optional to improve the new machine learning model with a few auto-selected labels. The new six-step process consists of 1) creating a similarity graph between source models (element 500); 2) learning optimal pseudo tasks for each source model (element 502); 3) extracting components from source models (element 504); 4) building a dictionary of abstract attributes from the components (element 506); 5) aligning target data with model data to map the target data onto abstract attributes in the dictionary (element 508); and 6) active learning for data for which there is not a good match with existing attributes (element 510). In the following, the six steps are first outlined and then the entire system is described in detail below.

(3.1) Step 1: Source-Similarity-Graph (SSG) Creation (Element 500)

The SSG creation step (Step 1; element 500) leverages a multitude of pre-existing data sources from a database of models with training data (element 512), which include machine learning datasets and associated models. The system measures similarity between models (element 514) and, based on a similarity measure computed between the source models, the SSG (element 516) is created that links the models based on their nearest neighbors. The benefit of the SSG (element 516) is to quickly find a small set of models that are closest to the target data.

(3.2) Step 2: Pseudo-Tasks Optimization (Element 502)

Pseudo-task optimization for SSL is performed on all source models (element 518) to find the best pseudo task (element 520) for each source model. The optimization criterium is to create networks that allow a discriminative component extraction comparable to what is obtained from a network trained in a supervised way, since source labels are known. Then, on a large set of unlabeled target data (element 522), self-supervised learning (SSL) is again carried out by combining the best pseudo tasks (element 520) from the closest source models. In other words, a network is trained for target data with SSL using pseudo tasks from the closest source models (element 524). The result is an initial target network (element 526) that maps the input onto a latent feature space.

(3.3) Step 3: Unsupervised Data Decomposition (Element 504)

Given the trained networks from the sources, the process according to embodiments of the present disclosure automatically extracts salient components from input data (e.g., extracting the cropped image of a car tire) using unsupervised data decomposition (element 528), as described in detail in Literature Reference No. 3. The end result is a set of components for each source model (element 530) in input space for each labeled source input.

(3.4) Step 4: Attribute-Dictionary Creation (Element 506)

In the attribute-dictionary creation step (element 506), components of all source models and corresponding labels (element 532) are mapped across input data and sources onto abstract attributes (element 534). This mapping can be carried out through unsupervised clustering of the abstract attributes (element 536), resulting in semantically meaningful clusters, such as a cluster of bike wheels (described in Literature Reference No. 3). Given the mined attributes, a dictionary of sets of abstract attributes is built (element 538), resulting in an attribute dictionary (element 540). For each set, the corresponding labels from the sources are obtained. Thus, for objects and actions, a mapping from the attributes onto labels can be learned.

(3.5) Step 5: Zero-Shot Attribute Distillation (Element 508)

Given the attributes from the sources in the attribute dictionary (element 540), the initial target network (element 526), and the source models, the unlabeled target data (element 522) needs to be processed so that the unlabeled target data (element 522) maps onto the right set of attributes (i.e., map target data onto abstract attributes (element 542). To achieve this mapping, the closest source model or models is selected based on the SSG (element 516) and then a zero-shot attribute distillation method (element 544) is used to align the sources with the target. Alignment happens by learning a shared latent space for the source and target models that is predictive of the attributes for the source data and simultaneously generative of the target data. As a result, there is a new target network (element 546) that maps target data onto a probability distribution over the abstract attributes in the attribute dictionary (element 540). This distribution can then be mapped onto a label or sentence. Note that in all of these five steps, not a single training label was used to assign labels to data from a new domain.

Distilled embedding (element 620) refers to the set of representations (i.e., deep neural activations) of the unlabeled target data (element 602) that are already aligned with one or more source models. Update embedding (element 622) refers to updating the target representations (via updating the target model) using the information provided by the oracle (element 616) through active learning (element 510) (through inquiry).

(3.6) Step 6: Active Learning (Element 510)

For some data, a good attribute representation may not be found, where goodness is, for instance, measured by having high values in the attribute probability distribution or high confidence in these values. For data without a good representation, an active learning method (element 548) is used. To carry out this learning in a label-efficient way using selected labels from an oracle (element 550) (i.e., human labeler), all data for which active learning is required is collected from the new target network (element 546), and then label propagation in the latent feature space of the data is carried out. The result is an improved attribute dictionary and refined target network (element 552).

The output of these six steps (elements 500, 502, 504, 506, 508, and 510) is a trained network (new target network (element 546)) that returns labels for a target domain. These steps describe the process for training a new network from scratch. If the goal is to only adapt a network to a new sensor or different viewpoint or lighting, the process described above can be simplified. Here, a trained model from the six-step process is used as a starting point, which becomes the new source model, which is input to the feature space (element 400) and part of the different source datasets (element 604).

Figure 6:
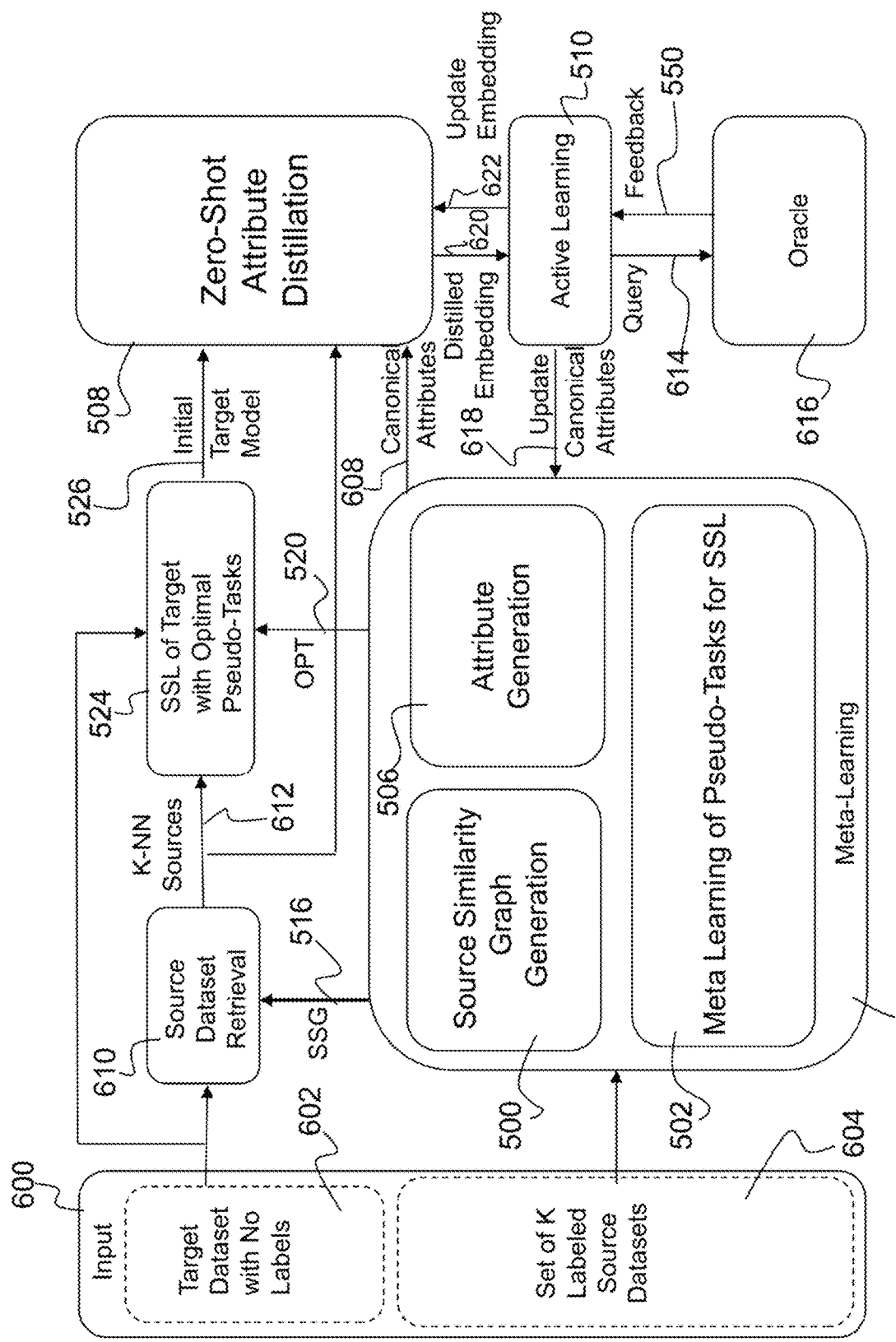
FIG. 6 is an illustration of an architecture that integrates meta-learning, self-supervision, and zero-shot learning to achieve learning with less than one label per class according to some embodiments of the present disclosure.

In the following, the invented process is described in more detail. A functional-level representation of the architecture for learning a target model is shown in FIG. 6. The output of this process is a new target model that is generated by zero-shot attribute distillation (element 508) and used in the components (element 310) to identify a new object. The inputs (element 600) to the system described herein are the target dataset with no labels (element 602) and a set of annotated/labeled source datasets (element 604) that contain relevant and irrelevant datasets to the target dataset.

Meta-learning on the source datasets (element 606) is used to learn three things: the SSG (element 516) for different datasets, optimal pseudo-tasks (OPT) for source datasets (element 520), and a set of canonical attributes (element 608). The meta-learning module (element 606) utilizes source similarity graph generation (element 500), attribute generation (element 506), and meta learning of pseudo-tasks for SSL (element 502). The target data (element 602) is then placed on the SSG (element 516) in source dataset retrieval (element 610) to retrieve relevant source datasets. The optimal pseudo-tasks (OPT) (element 520) for relevant sources (i.e., K-NN sources (element 612)) are used to define a target pseudo-task and an SSL model is learned from scratch for the target dataset (i.e., SSL of target with optimal pseudo-tasks (element 524)).

Next, the relevant sources (i.e., K-NN sources (element 612)) and their corresponding attributes (i.e., canonical attributes (element 608) are used together with the target data (i.e., initial target model (element 526)) to tune the SSL trained model and perform zero-shot attribute distillation (element 508). Finally, the uncertain attributes/components of the target data are used as a proxy for active learning (element 510) to inquire/query (element 614) class labels for a few target samples from an oracle (element 616). The inquired labels (i.e., selected labels from oracle (element 550)) are then used as feedback signal to further tune the model and enrich/update the set of canonical attributes (element 618).

(3.7) Step 1: Source Similarity Graph (Element 516)

Transfer learning is a natural choice for learning a target dataset with few (or no) labels (element 602) in the presence of relevant source dataset(s) with abundant labeled data (element 604). Identifying the relevant source dataset(s) (i.e., K-NN sources (element 612)), however, remains to be a core challenge in transfer learning applications. This difficulty is due to a phenomenon known as 'negative transfer', which occurs when knowledge is transferred from irrelevant source domains and in which transfer learning degrades the learning performance instead of improving it. Current transfer learning methods often assume known relevant source domains, which are handpicked by a human expert. Obtaining a fully automated transfer learning system requires a quantitative notion of relevance between different datasets, so that a machine is capable of choosing the relevant source dataset(s) from a large pool of datasets to solve a task for the input target dataset.

Figure 7:
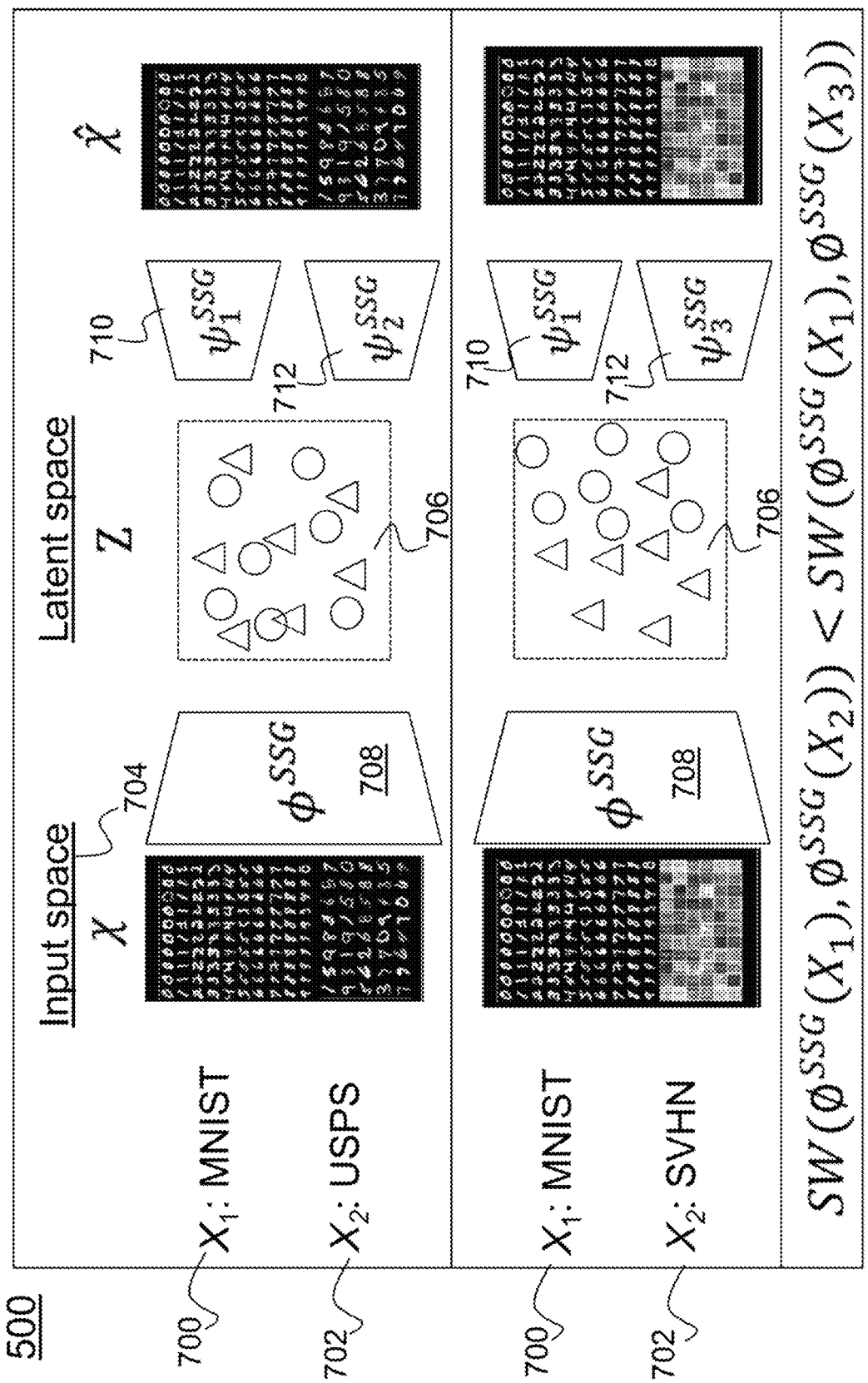
FIG. 7 is an illustration of measuring similarity between datasets using a shared encoder according to some embodiments of the present disclosure.

To address this challenge, a unique similarity measure is computed between different datasets in the present invention. FIG. 7 illustrates measuring similarity between datasets, $X_1$ (e.g., MNIST (Modified National Institute of Standards and Technology) (element 700) and $X_2$ (e.g., USPS (U.S. Postal Service) or SVHN (Street View House Numbers) (element 702), where the similarity measures their distributional distance in a lower dimensional shared latent space (element 706). An example for such a similarity measure is the sliced-Wasserstein distance (Literature Reference No 4). A shared encoder, $\phi^{SSG}$ (element 708), is used for both datasets (elements 700 and 702), and the latent space (element 706) of the encoder (i.e., the output of the encoder) is required to be generative for both datasets in the sense that both domains can be recovered from the latent space (element 706) via decoders, $\psi_1^{SSG}$ (element 710) and $\psi_2^{SSG}$ (element 712). The process according to embodiments of the present disclosure compares the distributions in the latent space for two different datasets and generates a similarity graph.

Let $X_i = \{x_n^i\}_{n=1}^{N_i}$ denote the samples from the i'th source dataset. To measure the similarity between two datasets $X_i$ and $X_j$, first ensure that they are in the same Hilbert space (i.e., $x_n^i, x_m^i \in \mathcal{X}$). If they are not already in the same space, there are two different options. The first involves resizing the input images. The second involves using different preprocessing networks to provide a preliminary map to the same Hilbert space. Then, a mapping $\phi^{SSG}: \mathcal{X} \to \mathcal{Z}$ (e.g., a deep neural encoder) is identified that encodes the datasets into a shared latent space, while requiring this latent space to be generative for the two datasets, as described above. This means that decoders $\psi_i^{SSG}$ and $\psi_j^{SSG}: \mathcal{Z} \to \mathcal{X}$ are learned alongside the shared encoder $\phi$ such that $\psi_i^{SSG}(\phi^{SSG}(x_n^i)) \approx x_n^i$ and $\psi_j^{SSG}(\phi^{SSG}(x_m^j)) \approx x_m^j$. Finally, the dissimilarity between the datasets is defined as a metric between the empirical distributions of the two datasets in the latent space. Here, a possible metric is the sliced-Wasserstein metric, which has theoretical merits against classic information-theoretic dissimilarity metrics, such as KL-divergence (see Literature Reference Nos. 4 and 5). Therefore, the distance is:

$$d(X_i, X_j) = SW_2(\{\phi^{SSG}(x_n^i)\}_n, \{\phi^{SSG}(x_m^i)\}_m).$$

Having the distances between pair of source datasets, a K-Nearest Neighbors (K-NN) similarity graph is formed, where each node of a graph is a source dataset and the edges identify the closeness of the datasets to one another. For example, if the distance d is below a threshold (e.g., 0.5, an edge is formed in the similarity graph). To overcome the computational expense of calculating pairwise distances between all source datasets, the system described herein utilizes an efficient approximation of a K-NN graph, e.g., the one proposed by Dong et al. (see Literature Reference No. 6). Finally, for a target dataset, a computationally efficient algorithm (e.g., Literature Reference No. 10) is used for proximity search on large graphs. The result is an automated way of obtaining the nearest (i.e., most relevant) source datasets to the target dataset, which leads to a seamless transfer learning with minimized negative transfer effect.

Figure 8:
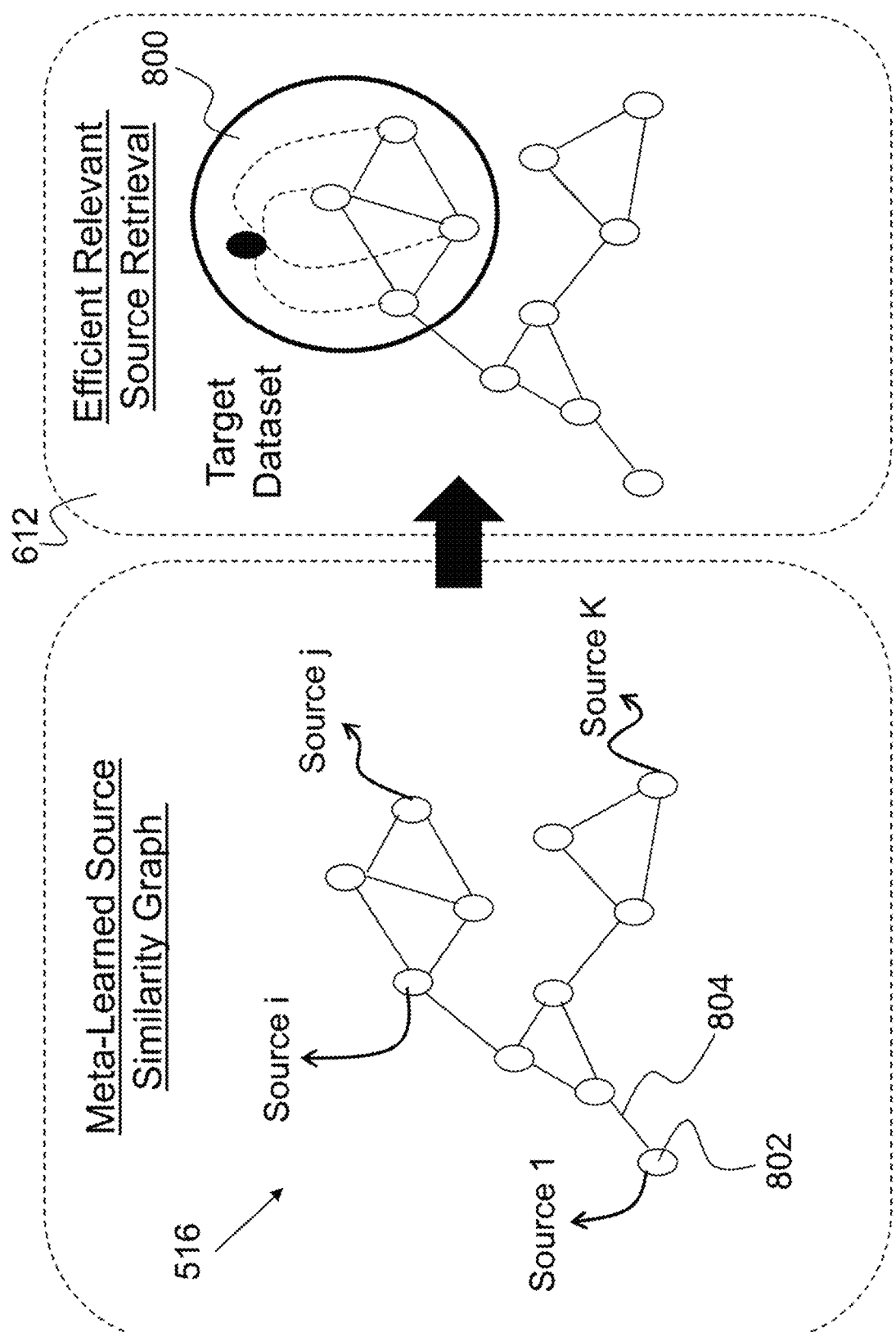
FIG. 8 is an illustration of using a Source Similarity Graph (SSG) for efficient retrieval of relevant sources, depicted as source dataset retrieval in FIG. 6, when presenting a new target dataset according to some embodiments of the present disclosure.

FIG. 8 depicts the Source Similarity Graph (SSG) (element 516) allowing efficient retrieval of relevant sources (element 612) when presenting a new target dataset (element 800). Using the pairwise distance between source datasets, an SSG (element 516) is formed, where each node (represented by a circle, e.g., element 802)) of the SSG (element 516) is a source dataset, and each edge's (represented by a line, e.g., element 804) length/weight identifies the similarity between two datasets. For a target dataset (element 800), an efficient proximity search is used on the SSG (element 516) to retrieve the most relevant source datasets (element 612).

(3.8) Step 2: Pseudo-Tasks Optimization (Element 502)

Figure 9:
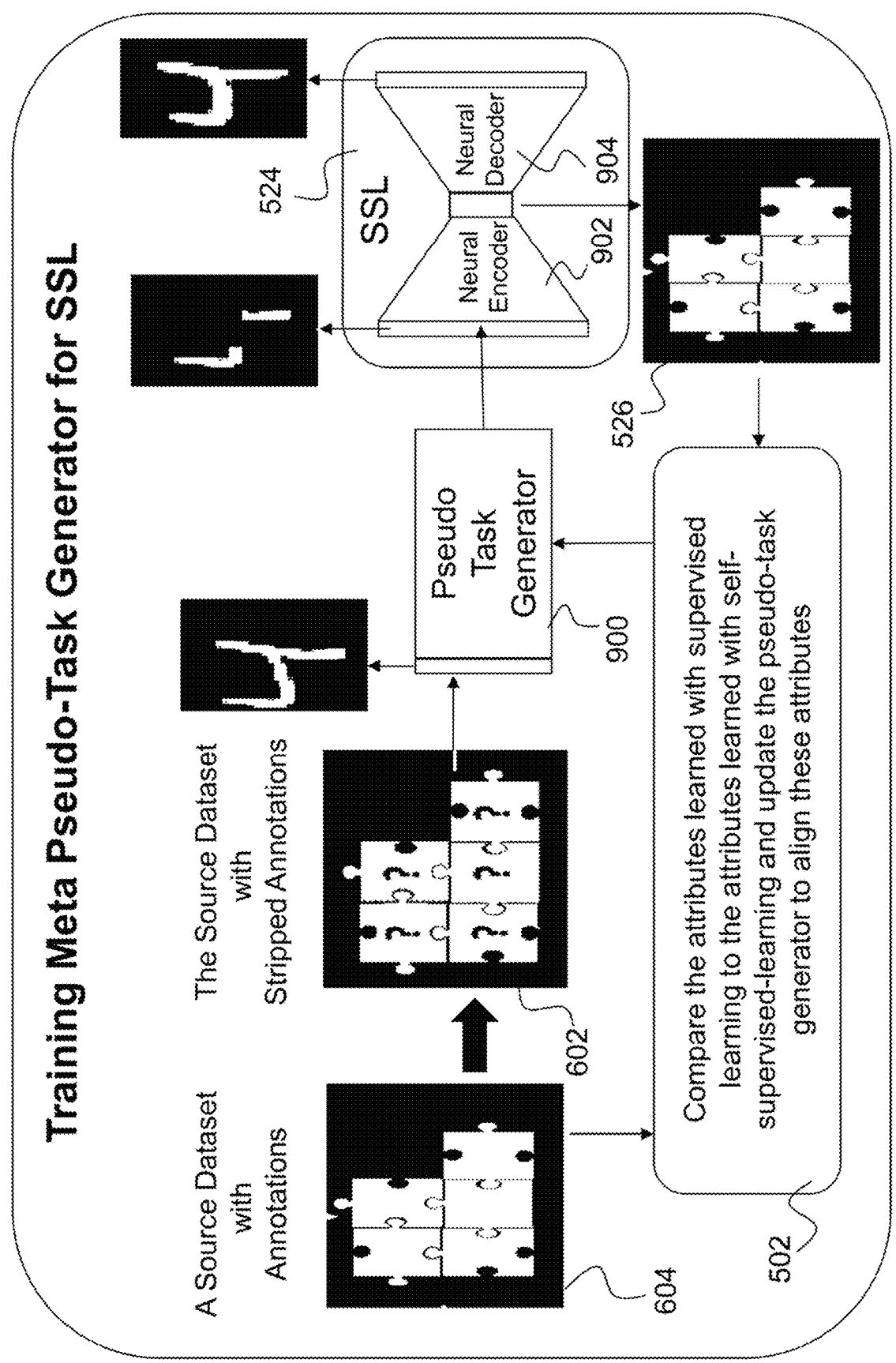
FIG. 9 is an illustration of pseudo-task optimization, depicted as meta learning of pseudo-tasks for SSL in FIG. 6, enabling self-supervised learning (SSL) to generate attribute distributions similar to those learned by a model trained with full supervision according to some embodiments of the present disclosure.

Self-Supervised Learning (SSL) involves solving a pseudo-task over unlabeled data to learn an internal representation that allows for solving the real task(s) with much fewer labels. The pseudo-tasks in current SSL methods are hand-designed such that they uncover relevant features of the data for a target task, while the performance of the network is easily measured for the pseudo-task. Non-limiting examples of common pseudo-tasks are 1) recovering the data from a lower dimensional embedding space, as in auto-encoders; 2) leaving out parts of the input data and requiring the network to reconstruct the missing data; and 3) permuting the information in the input data and requiring the network to recover the un-permuted data. In the present invention, the pseudo tasks are learned. FIG. 9 depicts training of the meta pseudo-task generator for SSL, which enables SSL to generate attribute/component distributions similar to those learned by a model trained with full supervision. The pseudo task generator (element 900) is a function that is applied to the input image to discard some of the information in the input image (e.g., cut out part of the image, convert from color to grayscale). The neural encoder (element 902) and neural decoder (element 904) are deep convolutional neural networks with mirrored architectures. The neural encoder (element 902) squeezes the information of the pseudo-input image (i.e., input image that has gone through the pseudo task generator (element 900) into a low-dimensional vector space/latent space. The neural decoder (element 904) aims to recover the information of the original input image from this low-dimensional vector representation.

The SSG module (element 516) described above provides the relevance of source datasets with the target dataset. The relevance is used for two things: 1) attribute distillation; and 2) providing a near optimal pseudo-task for the target data that enables one to learn a good initial model for the target dataset from scratch. Let $\{X_i\}_i$ be the set of all sources and let $\{f_i: \mathcal{X} \to \mathcal{X}\}_i$ be their corresponding optimal pseudo-tasks for these datasets. For the target dataset $X_T \in \mathcal{X}$, let $\{\alpha_i\}_i$ denote the relevance or similarities of the target to the source datasets such that $\Sigma_i \alpha_i = 1$. Then, a new pseudo-task is designed for the target data as a function of $\{f_i: \mathcal{X} \to \mathcal{X}\}_i$ and $\{\alpha_i\}_i$. As obvious to one skilled in the art, there are various options to do this. The most straightforward way is to use pseudo-task $f_i$ in training the target model $\alpha_i$ percent of the time. In addition, a composition rule is learned to find a pseudo-task as a function of the source pseudo-tasks (i.e., $f_T = g(\{\alpha_i\}_i, \{f_i\}_i)$.

(3.9) Step 3: Unsupervised Data Decomposition (Element 504)

Figure 10:
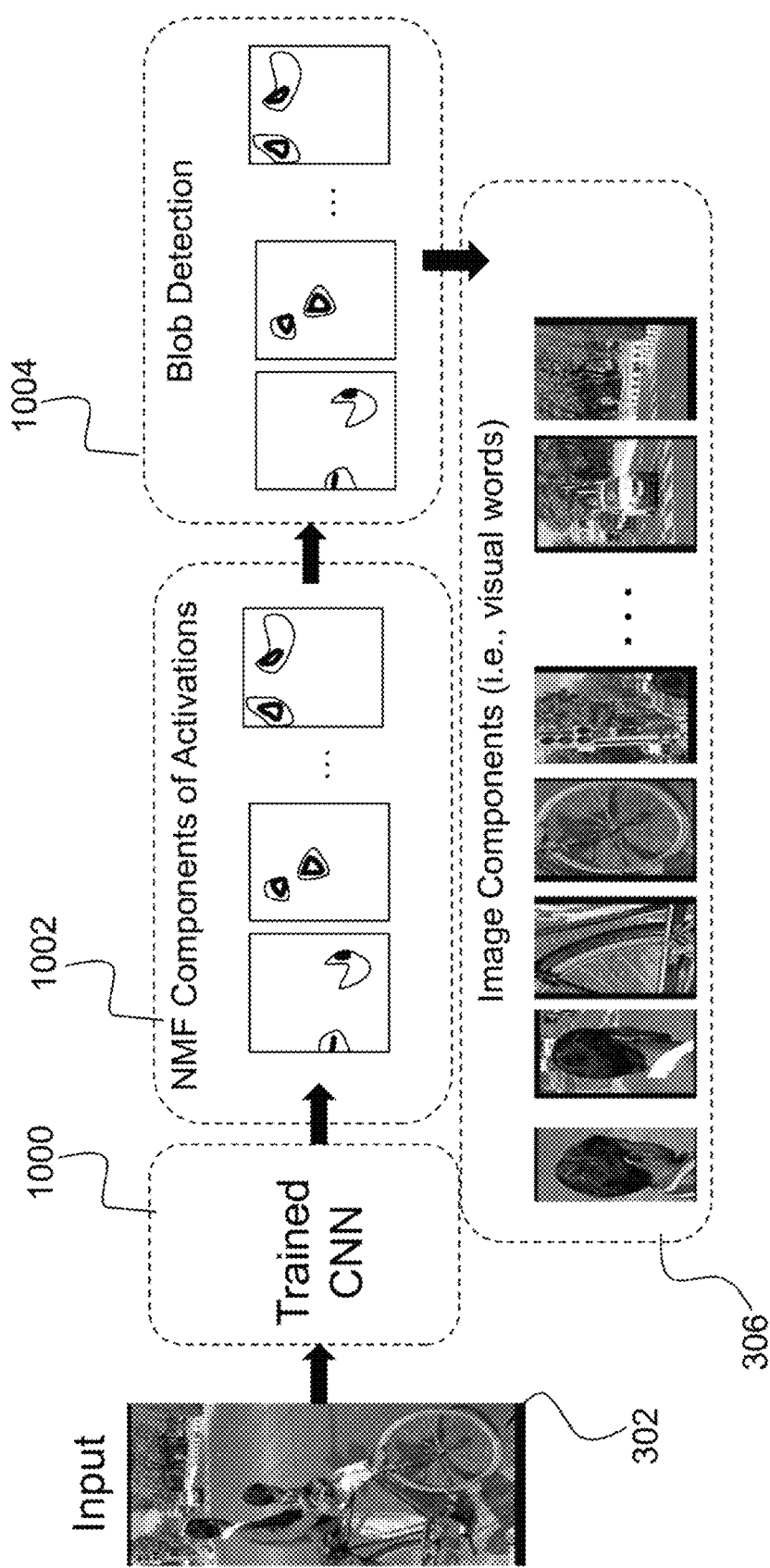
FIG. 10 is an illustration of dissecting an input image into its components according to some embodiments of the present disclosure.

It is challenging to interpret data as a combination of its components that could be shared between different datasets. The data components are standalone entities of information that piece together a data sample. Here, the rationale is that comparing samples from different source datasets (with potential appearance changes) on a component basis is more effective than as a whole. To obtain data components, an input data point (e.g., an image) is dissected based on its neural activation patterns with respect to a trained neural network model (e.g., via SSL, as above). In Literature Reference No. 3, the authors disclosed that the Nonnegative Matrix Factorization (NMF) of the final convolutional layer of a pre-trained convolutional neural network (CNN) leads to blob-like masks that identify the semantically meaningful components in the input image. As shown in FIG. 10, the system according to embodiments of the present disclosure dissects an input image (element 302) into its image components (element 306), or visual words. The rationale here is that the image components (element 306) have a higher chance of being shared among different source datasets. The pre-trained model (i.e., trained CNN (element 1000) for a dataset is used, and its neural activations (i.e., NMF components of activations (element 1002)) for the input image (element 302) are analyzed in an unsupervised manner via blob detection (element 1004) to identify the image components (element 306). Similar ideas could be extended to the video and textual domains.

Figure 11:
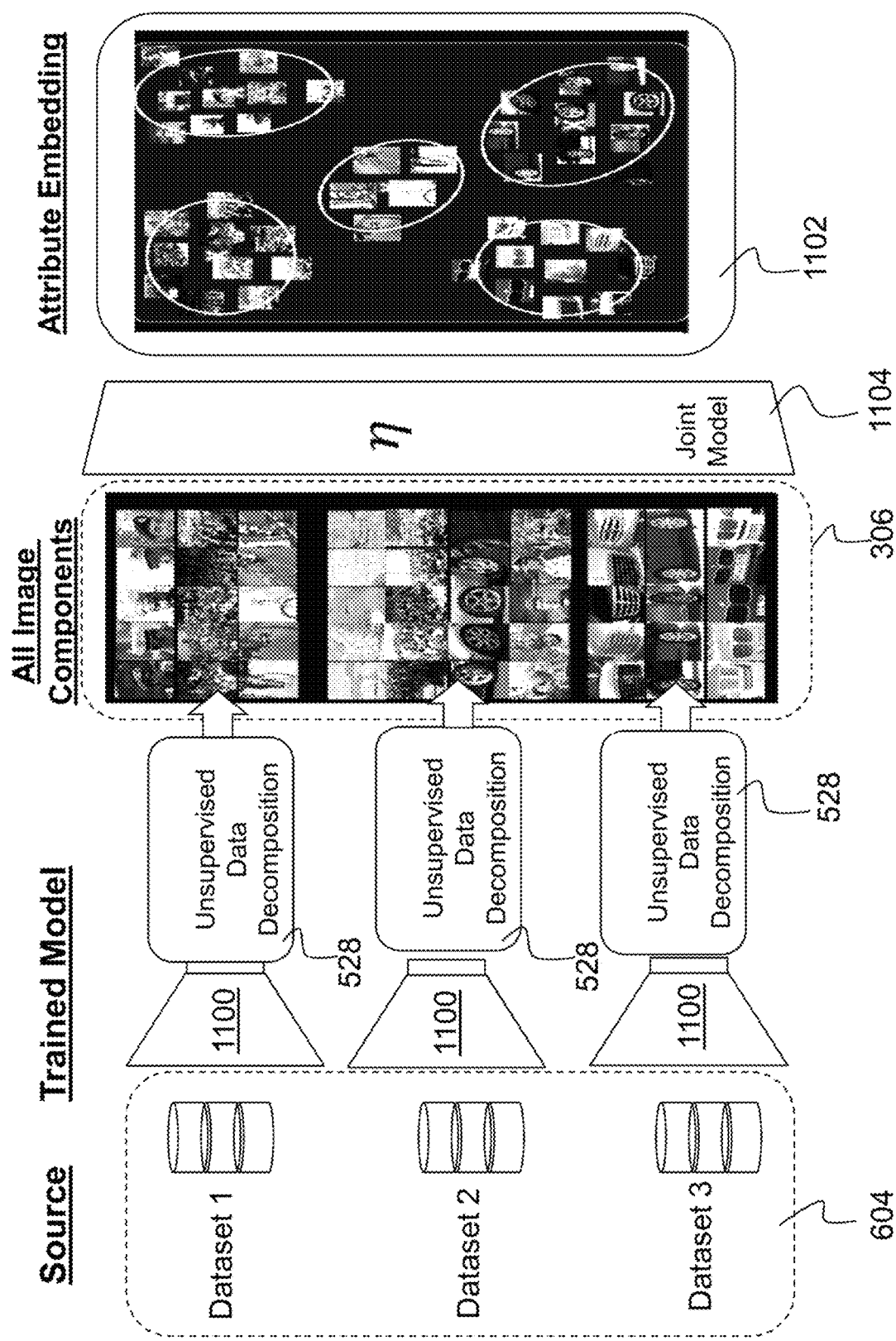
FIG. 11 is an illustration of using learned models to dissect the input images into components using unsupervised data decomposition, depicted as attribute generation in FIG. 6, according to some embodiments of the present disclosure.

As depicted in FIG. 11, each unsupervised data decomposition module (element 528) enables the use of the learned/trained models (element 1100) (e.g., an a priori trained model on a related dataset) and dissection of the input images into image components (element 306). Image components (element 306) extracted from all source models and datasets (element 604) are unified to provide groups of components, referred to as attributes, that cover all source datasets (element 604).

(3.10) Step 4: Attribute Dictionary Creation (Element 506)

Another challenge is to unify the extracted image components (element 306) from different source datasets (element 604) into a shared set of components, or attributes. To solve this challenge, a joint embedding, or attribute embedding (element 1102), is learned for all extracted image components (element 306) from source datasets (element 604) via a joint encoder η (joint model; element 1104). SSL is used to learn such neural encoder, η (element 1104) for all image components (element 306). Having a joint embedding on the image components (element 306), in the embedding space, clustering is performed (e.g., using Sliced-Wasserstein Gaussian Mixture Model (see Literature Reference No. 7) to obtain machine learned attributes for source datasets (i.e., attribute embedding (element 1102)).

As described above, the source datasets (element 604) are processed to obtain the attributes for each sample in each dataset. In short, for the n'th sample from the i'th source dataset, $x_n^i \in X_i$, the input is dissected into its components (i.e., into textual or visual words) (element 306), then the image components (element 306) are embedded into the joint embedding via joint model η (element 1104), and the corresponding attributes for $x_n^i$, $a_n^i$ are obtained. In this manner, the source datasets will have data, labels, and attributes, $(x_n^i, y_n^i, a_n^i)$, which are collected into a dictionary. The mined attributes enable performance of zero-shot learning on the target dataset.

(3.11) Step 5: Zero-Shot Attribute Distillation (Element 544)

Figure 12:
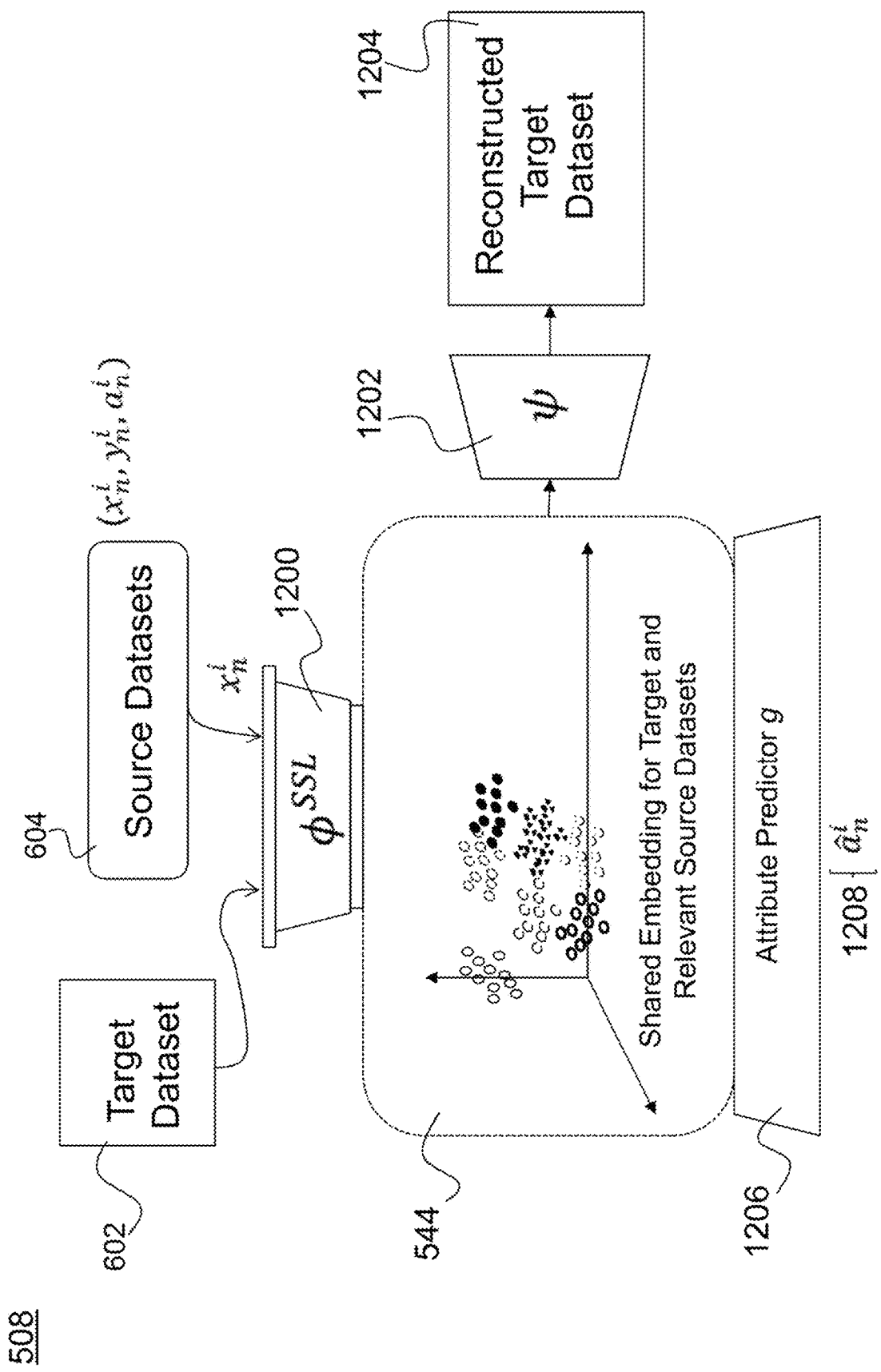
FIG. 12 is an illustration of zero-shot attribute distillation using a shared embedding to map target data onto mined attributes according to some embodiments of the present disclosure.

As depicted in FIG. 12, images from the source datasets (element 604) and the target dataset (element 602) both go through the shared neural encoder, $\phi^{SSL}$ (element 1200), and a latent representation (a vector) for each image from each dataset/domain is obtained. Images from the source datasets (element 604) have ground truth attributes, and the goal is to train the shared neural encoder, $\phi^{SSL}$ (element 1200) such that its output is representative of the attributes for the source datasets (element 604) (i.e., one should be able to recover the attributes of images from the source domain from this latent space). However, the target dataset (element 602) doesn't have ground truth attributes, so the output of $\phi^{SSL}$ (element 1200) must be made representative of the target domain for images from the target dataset (element 602). This is done by using a neural decoder $\psi$ (element 1202) that reconstructs the target images from the target dataset using the same latent representation as for the source data, resulting in a reconstructed target dataset (element 1204). In other words, the decoder $\psi$ (element 1202) enforces the shared neural encoder, $\phi^{SSL}$ (element 1200) to maintain the critical information of the target dataset (element 602).

The zero-shot attribute distillation module (element 544) receives the target dataset (element 602), samples from relevant source datasets (K nearest neighbor sources), their corresponding mined attributes (i.e., canonical attributes (element 608)), and the SSL-trained target model (element 526). The attributes are different from the labels and are mined as described above. For instance, while the label for a sample is 'car', its attributes could be 'has wheels', 'is metal', etc. The twist here is that since the attributes are mined by a machine there is no human labeling them (i.e., they are abstract, but still encode class-specific characteristics).

The challenge is to map new target data onto the same attributes. Starting from a good model for the target dataset (i.e., the SSL trained model (element 526)), the model is retuned such that the provided embedding is: 1) generative for the target dataset, and 2) the mined attributes for the relevant source datasets can be predicted from the embedding via a shallow regressor, g (element 1206) Having tuned such a model, $\phi$ (element 1200) and g (element 1206), $\hat{a}_m = g(\phi(x_m^T))$ is then used as an approximation of the attributes for the target dataset (element 602). The catch here is that only attributes that were predicted with a high confidence (i.e., $\tilde{a}_m = \gamma(\hat{a}_m)$, are used where $\gamma$ thresholds the predicted attributes based on the certainty of the prediction.

Zero-shot attribute distillation (element 544) uses a shared embedding to map the target dataset (element 602) onto mined attributes. The SSL trained model (element 526) for the target dataset (element 602) is jointly tuned on relevant source datasets (element 604), such that the latent space is predictive of the components/attributes for the source datasets, while the latent space should remain a generative space for the target domain.

(3.12) Step 6: Active Learning of Novel Classes and/or Attributes (Element 548)

Referring to FIG. 12, with zero-shot attribute distillation (element 544), one is able to recognize classes of data for which there exists an attribute representation in the source datasets. However, this representation can be insufficient when new classes or new attributes exist in the target dataset (element 602). In the presence of new classes and/or attributes, active learning (element 548) is used to disambiguate the new information. The approach according to embodiments of the present disclosure is as follows. Starting with an SSL-trained model (element 526) for the target dataset (element 602), the target samples first go through the zero-shot distillation pipeline (element 544), which predicts target attributes (element 1202). Referring to FIG. 11, the target model (element 1100) is then used together with the unsupervised data decomposition (element 528) to dissect data into their components (element 306). The dissected components (element 306) are then fed to the joint component model, $\eta$ (element 1104), and novel attributes are detected via cluster analysis in the latent space of $\eta$ (element 1104). This process filters the samples that are ambiguous and require further clarification. Then active learning (element 548) is performed on these ambiguous samples such that the ambiguity is resolved based on minimal inquiries to a human user/operator. For active learning (element 548), a non-limiting example is a combination of least confidence, margin sampling, and entropy sampling (see Literature Reference No. 8) to select the top most informative/uncertain data points among samples that have the largest uncertainty.

In summary, the invention according to embodiments of the present disclosure meta-learns unsupervised learning algorithms by optimizing pseudo tasks for the source datasets. Moreover, it will generate machine-learned attributes from the source datasets that are leveraged to predict classes of the target dataset without requiring labels. Finally, the system described herein is capable of inquiring new attributes and learning new classes using its unsupervised component decomposition together with active learning. To adapt a target model learned from scratch to a new target domain, a shared latent space is used, and the old and new target datasets are embedded into this space. The models are then tuned to achieve three things: 1) solve an optimal pseudo task for the new target data; 2) remain discriminative for the old target dataset; and 3) be domain agnostic. By requiring the latent space to be domain agnostic, the latent distributions of the two datasets are enforced to be undistinguishable from one another. The pseudo-task optimization for the target dataset forces the model to carefully preserve information in the new target domain while, simultaneously, being discriminative for the old dataset.

The label efficient learning of a model without utilizing or relying on any previous work in the present invention emerges from the interplay between meta-learning, self-supervision, unsupervised component decomposition, and transfer learning. At the meta-level, the following is used: 1) a unique similarity measure between source datasets that enables generation of the Source Similarity Graph (SSG) on these datasets; 2) a memory of shared attributes that are building blocks (e.g., all known object parts for object detection) of the source datasets; and 3) learning the optimal pseudo tasks for source datasets that constrain a self-supervised learner to learn data attributes which are similar to those learned in a model with full supervision. For optimal self-supervision in the target domain, relevant source pseudo-tasks are composed. Finally, for transferring learned knowledge from relevant source datasets to the target dataset, zero-shot attribute distillation is implemented, which recovers shared attributes between the source and target datasets. The target data, however, could contain attributes that did not exist in the source datasets, and therefore, there are no corresponding attributes in the attribute dictionary. To enable the system to learn such novel attributes, active learning is leveraged, where the system inquires class labels from a human labeler for samples that would disambiguate the uncertainty associated with the novel attributes. The feedback from the human is then used to further tune the network to achieve an optimal embedding. Finally, the newly identified attributes are added to the set of mined dictionary attributes for solving future tasks.

The invention described herein enables a significant reduction in the number of labeled training data required for learning new image classes. State-of-the-art machine learning models require millions of labeled data. Labeling data, which usually requires manual labor, can be expensive, particularly, for sensitive data. Moreover, such labeling is time critical when needed to adapt robots in the field. The system and method according to embodiments of the present disclosure can be used in automatic control of an autonomous platform, such as a robot, autonomous self-driving ground vehicle, unmanned aerial vehicle (UAV). Non-limiting examples of devices that can be controlled via the processor 104 include a motor vehicle or a motor vehicle component (electrical, non-electrical, mechanical), such as a brake, a steering mechanism, suspension, or safety device (e.g., airbags, seatbelt tensioners, etc.). For instance, upon labeling and, thus identification, of an object in the target domain, the action to be performed can be a driving operation/maneuver (such as steering or another command) in line with driving parameters in accordance with the now labeled object. For example, if the system recognizes a bicyclist, another vehicle, or a pedestrian in the environments surrounding the autonomous driving system/vehicle, the system described herein can cause a vehicle maneuver/operation to be performed to avoid a collision with the bicyclist or vehicle (or any other object that should be avoided while driving). The system can cause the autonomous vehicle to apply a functional movement response, which may be the task to be performed, such as a braking operation followed by a steering operation (etc.), to redirect vehicle away from the object, thereby avoiding a collision.

Other appropriate actions may include one or more of a steering operation, a throttle operation to increase speed or to decrease speed, or a decision to maintain course and speed without change. The responses may be appropriate for avoiding a collision, improving travel speed, or improving efficiency. As can be appreciated by one skilled in the art, control of other device types is also possible. Thus, there are a number of automated actions that can be initiated by the autonomous platform given the particular object assigned a label and the target domain in which the system is implemented.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for learning object labels for control of an autonomous platform, the system comprising:
   one or more processors and a non-transitory computer-readable medium having executable instructions encoded thereon such that when executed, the one or more processors based on a similarity measure computed between a set of prior trained source models, creating a source similarity graph of similar source models;
   performing pseudo-task optimization to identify a pseudo-task for each source model in the source similarity graph, wherein performing pseudo-task optimization comprises:
   identifying a pseudo-task for a target data set $X_T \in \mathcal{X}$ as a function of $\{f_i: \mathcal{X} \to \mathcal{X}\}_i$ and $\{\alpha_i\}_i$,
   where $\{\alpha_i\}_i$ denotes similarities of the target data set to the set of prior trained source models $\{X_i\}_i$ such that $\Sigma_i \alpha_i = 1$, and
   where $\{f_i: \mathcal{X} \to \mathcal{X}\}_i$ denotes corresponding pseudo-tasks for the set of prior trained source models;
   combining the pseudo-tasks identified;
   using the combined pseudo-tasks and a set of unlabeled target data, training a target network;
   using the trained target network, extracting salient components from input image data, resulting in a plurality of source image components having corresponding labels for each source model;
   mapping the plurality of source image components and corresponding labels onto sets of abstract attributes, resulting in semantically meaningful clusters of abstract attributes;
   aligning, in feature space, new image components from a previously unseen input image with feature space representations of the plurality of source image components;
   mapping the new image components onto corresponding abstract attributes;
   generating a new target network from the mapping;
   using the new target network, assigning an object label to an object in the previously unseen input image; and
   controlling the autonomous platform based on the assigned object label.

2. The system as set forth in claim 1, wherein controlling the autonomous platform further comprises:
   generating an executable control script appropriate for the object label; and
   causing the autonomous platform to execute the control script and perform an action corresponding to the control script.

3. The system as set forth in claim 1, wherein the salient components are extracted using unsupervised data decomposition.

4. The system as set forth in claim 1, wherein the autonomous platform is a vehicle, and wherein the one or more processors further perform an operation of causing the vehicle to perform a driving operation in accordance with the assigned object label.

5. A computer implemented method for learning object labels for control of an autonomous platform, the method comprising an act of:
   causing one or more processors to execute instructions encoded on a non-transitory computer-readable medium, such that upon execution, the one or more processors perform operations of:
   based on a similarity measure computed between a set of prior trained source models, creating a source similarity graph of similar source models;
   performing pseudo-task optimization to identify a pseudo-task for each source model in the source similarity graph, wherein performing pseudo-task optimization comprises:

identifying a pseudo-task for a target data set $X_T \in \mathcal{X}$ as a function of $\{f_i: \mathcal{X} \to \mathcal{X}\}_i$ and $\{\alpha_i\}_i$, where $\{\alpha_i\}_i$ denotes similarities of the target data set to the set of prior trained source models $\{X_i\}_i$ such that $\Sigma_i \alpha_i = 1$, and where $\{f_i: \mathcal{X} \to \mathcal{X}\}_i$ denotes corresponding pseudo-tasks for the set of prior trained source models;

combining the pseudo-tasks identified;

using the combined pseudo-tasks and a set of unlabeled target data, training a target network;

using the trained target network, extracting salient components from input image data, resulting in a plurality of source image components having corresponding labels for each source model;

mapping the plurality of source image components and corresponding labels onto sets of abstract attributes, resulting in semantically meaningful clusters of abstract attributes;

aligning, in feature space, new image components from a previously unseen input image with feature space representations of the plurality of source image components;

mapping the new image components onto corresponding abstract attributes;

generating a new target network from the mapping;

using the new target network, assigning an object label to an object in the previously unseen input image; and controlling the autonomous platform based on the assigned object label.

6. The method as set forth in claim 5, wherein controlling the autonomous platform further comprises:

generating an executable control script appropriate for the object label; and causing the autonomous platform to execute the control script and perform an action corresponding to the control script.

7. The method as set forth in claim 5, wherein the salient components are extracted using unsupervised data decomposition.

8. The method as set forth in claim 5, wherein the autonomous platform is a vehicle, and wherein the one or more processors further perform an operation of causing the vehicle to perform a driving operation in accordance with the assigned object label.

9. A computer program product for learning object labels for control of an autonomous platform, the computer program product comprising:

computer-readable instructions stored on a non-transitory computer-readable medium that are executable by a computer having one or more processors for causing the processor to perform operations of:

based on a similarity measure computed between a set of prior trained source models, creating a source similarity graph of similar source models;

performing pseudo-task optimization to identify a pseudo-task for each source model in the source similarity graph, wherein performing pseudo-task optimization comprises:

identifying a pseudo-task for a target data set $X_T \in \mathcal{X}$ as a function of $\{f_i: \mathcal{X} \to \mathcal{X}\}_i$ and $\{\alpha_i\}_i$, where $\{\alpha_i\}_i$ denotes similarities of the target data set to the set of prior trained source models $\{X_i\}_i$ such that $\Sigma_i \alpha_i = 1$, and where $\{f_i: \mathcal{X} \to \mathcal{X}\}_i$ denotes corresponding pseudo-tasks for the set of prior trained source models;

combining the pseudo-tasks identified;

using the combined pseudo-tasks and a set of unlabeled target data, training a target network;

using the trained target network, extracting salient components from input image data, resulting in a plurality of source image components having corresponding labels for each source model;

mapping the plurality of source image components and corresponding labels onto sets of abstract attributes, resulting in semantically meaningful clusters of abstract attributes;

aligning, in feature space, new image components from a previously unseen input image with feature space representations of the plurality of source image components;

mapping the new image components onto corresponding abstract attributes;

generating a new target network from the mapping;

using the new target network, assigning an object label to an object in the previously unseen input image; and controlling the autonomous platform based on the assigned object label.

10. The computer program product as set forth in claim 9, wherein controlling the autonomous platform further comprises:

generating an executable control script appropriate for the object label; and causing the autonomous platform to execute the control script and perform an action corresponding to the control script.

11. The computer program product as set forth in claim 9, wherein the salient components are extracted using unsupervised data decomposition.

12. The computer program product as set forth in claim 9, wherein the autonomous platform is a vehicle, and wherein controlling the autonomous platform further comprises causing the vehicle to perform a driving operation in accordance with the assigned object label.

\* \* \* \* \*